Aug. 30, 1955 J. ROTHSTEIN 2,716,722

TEMPERATURE STABLE SOLID STATE ELECTRONIC DEVICES

Filed Sept. 2, 1954

INVENTOR.
JEROME ROTHSTEIN
BY
Harry M. Saragovitz
ATTORNEY

United States Patent Office 2,716,722

Patented Aug. 30, 1955

2,716,722

TEMPERATURE STABLE SOLID STATE ELECTRONIC DEVICES

Jerome Rothstein, Red Bank, N. J.

Application September 2, 1954, Serial No. 453,974

14 Claims. (Cl. 317—235)

Figure 1:
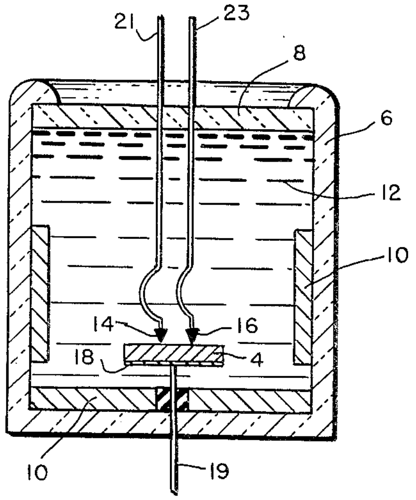

(Granted under Title 35, U. S. Code (1952), sec. 266)

The invention described herein may be manufactured and used by or for the Government for governmental purposes, without the payment of any royalty thereon.

This invention relates to solid state electronic devices and more particularly to semiconductor devices wherein the adverse effects thereon of temperature rise on the operating characteristics thereof is substantially overcome.

As is well known, semiconductor devices such as transistors and crystal diodes are replacing vacuum tubes in many circuit applications, especially where low weight, ruggedness and low power drain are important considerations.

One serious limitation of these semiconductor devices arises from the fact that their performance characteristics change with increasing temperature. The latter effect is due to the fact that the intrinsic contribution to the conductivity of the device increases and the back resistance of the P–N junctions becomes too low, both of these effects depending exponentially upon the quotients of forbidden gap width and absolute temperature. The seriousness of temperature limitation is very grave. For example, devices employing semiconductors such as hearing aid transistors have repeatedly become inoperative because of temperature rise resulting from close proximity to the body.

In the diamond type crystal lattice, which is the lattice form of germanium and silicon, the width of the forbidden gap, $E_g$ increases if the lattice is compressed. Thus, the adverse effects of raising the temperature could be counteracted if the forbidden gap width could be made to increase as compensation.

Qualitatively expressed, the resistance of a P–N junction in the reverse direction can be stated to a good degree of approximation as $$R_0=A\ \exp\ (E_g/kT)$$

wherein $R_0$ is the resistance in the reverse direction of the P–N junction. A can be taken as constant for a given device, $E_g$ is the width of the forbidden gap, $k$ is Boltzmann's constant and T is absolute temperature. The dependence of A on pressure and temperature may be neglected compared to the variation resulting from the variation of the exponential factor. In an article by Hall, Bardeen and Pearson, "Physical Review," vol. 84, pp. 129–132, Oct. 1, 1951, the above formula is discussed. In this article, the authors demonstrate that a pressure of 10,000 lbs./in.$^2$ gives a 12½% change in $R_0$.

Accordingly, the primary object of the invention is to provide a solid state electronic device wherein the detrimental effect of increasing temperature on the performance thereof is substantially eliminated.

In essence, the present invention provides a transistor, crystal diode or other solid state electronic device which is sealed in a container having a filling, the container and filling materials being so chosen that differential expansion of these materials submits the device to progressively increasing pressure as the temperature rises. The forbidden gap $E_g$ thereby increases so that the temperature range of useful operation is appreciably extended.

In accordance with the present invention, there is provided a solid state electronic device comprising a substantially rigid container consisting of a material having a relatively low coefficient of expansion, a semiconductor body within said container, electrodes in contact with said semiconductor body extending out of said container for connection in an external circuit, a substance in said container having a relatively high coefficient of expansion, and a pressure transmitting medium filling the remainder of said container whereby the pressure caused by the expansion of said substance due to a rise in temperature is transmitted to the semiconductor body by said medium. Of course, the high expansion substance may be provided to exert the pressure directly so that no pressure transmitting medium is required.

For a better understanding of the present invention together with other and further objects thereof, reference is had to the following description taken in connection with the accompanying drawing and its scope will be pointed out in the appended claims.

Figure 2:
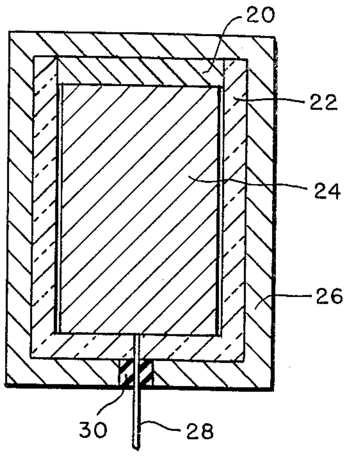

In the drawing,

Fig. 1 is preferred embodiment of a point contact transistor in accordance with the present invention and Fig. 2 is another embodiment of the present invention wherein the device is a junction crystal diode.

Referring now more particularly to Fig. 1, a semiconductor body 4 consisting of a semiconductor material such as germanium, silicon, and the like is contained within a housing 6. Housing 6 consists of a rigid material which has a coefficient of expansion substantially smaller than the average coefficient of expansion of its contents and may be of ceramic or low coefficient of expansion metals such as molybdenum and tungsten, or other material having like properties. It may be convenient for a portion 8 of housing 6 to be removable therefrom to assist in the fabrication of the device but portion 8 may also be integral with the remainder of housing 6. Contained within housing 6 are masses 10 of an expansion material substantially as shown. Masses 10 may be affixed to the inner wall of housing 6 in a suitable manner to firmly position them therein. The expansion material should be a substance which has a relatively high coefficient of expansion. Masses 10 may consist for example of material such as copper, aluminum, German silver, Phosphor bronze, zinc, brass, lead and mercury. Of course, where masses 10 are of a conductive metal, it is necessary to prevent contact thereof with semiconductor body 4. Filling the remainder of the interior of housing 6 is a pressure transmitting medium 12 which preferably may be a fairly heavy clean nonreactive liquid such as a purified oil or a solid of very low liquidity to avoid shearing stresses on the semiconductor body. Point contact emitter 14 and collector 16 electrodes are in contact with one surface of semiconductor body 4 and an ohmic contact base electrode 18 is in contact with the other surface, leads 19, 21 and 23 from electrodes 14, 16 and 18 respectively extending through housing 4 for utilization in an external circuit. The device may be assembled by well known methods. It is preferable to perform the assembly at low temperatures, i. e., with chilled parts and working with cold tools on a refrigerated table, the contents being pressure packed with a hard or hydraulic press. Thus the contents are hermetically sealed.

In operation, as the temperature of the device rises, the masses 10 of expansion material progressively expand a much greater amount than housing 6 causing a pressure which is transmitted through medium 12 to be applied to semiconductor body 4 causing its lattice to be compressed. Thus the forbidden gap $E_g$ is made to increase as compensation for the increase in temperature and the back resistance $R_0$ remains substantially constant.

In Fig. 2, a junction diode 20 consisting of a semiconductor material such as germanium, silicon and the like and having a P–N junction therein is rigidly positioned within and at the open end of housing 22. Housing 22 similar to housing 6 of Fig. 1, consists of a similar rigid material having a low coefficient of expansion such as ceramic and the like. Contained in the remainder of the interior of and slightly spaced from the walls of, housing 22 and, in contact with doide 20 is an expansion element 24 such as copper, aluminum, German silver, Phosphor bronze, zinc, brass, lead, mercury or other metal or alloy having a high coefficient of expansion. The space between expansion element 21 and the walls of housing 10 is provided to permit lateral expansion of element 24 upon a rise in temperature. Surrounding housing 22 is an outer container 26 consisting of a relatively rigid conductive metal such as tungsten, molybdenum and the like. One electrode 28 of the device is in contact with expansion element 24 and extends through housing 22 and container 26 and is encompassed by insulation 30. Electrode 28 is thereby insulated from container 26. Container 26 itself in the device of Fig. 2 serves as the other electrode of diode 20 and a lead can be affixed thereto for utilization in an external circuit. Since expansion element 24 is directly in contact with diode 20, no pressure transmitting medium is needed therein. Thus, although hermetic sealing is desirable in the device of Fig. 2 to avoid the deleterious effects of moisture, it is not necessary for temperature compensation. A similar construction can be used for a junction type transistor or tetrode, the only change being an increased number of electrodes.

While there have been described what are at present, considered to be the preferred embodiments of the invention, it will be understood by those skilled in the art that various changes and modifications may be made therein without departing from the invention and it is, therefore, aimed in the appended claims to cover all such modifications as fall within the spirit and scope of the invention.

What is claimed is:

1. A solid state electronic device comprising a substantially rigid container consisting of a material having a relatively low coefficient of expansion, a semiconductor body within said container, electrodes in contact with said semiconductor body, a substance in said container having a relatively high coefficient of expansion, and a pressure transmitting medium whereby the pressure caused by the expansion of said substance due to a rise in temperature is transmitted to the semiconductor body by said medium.

2. A temperature stable transistor structure comprising a rigid housing consisting of a material having a low coefficient of expansion, a semi-conductor body within said housing, said semiconductor body having point contact emitter and collector electrodes and an ohmic contact base electrode, a mass of a substance within said housing free of said semiconductor body and said electrodes and having a relatively high coefficient of expansion, and a pressure transmitting medium filling the remainder of the interior of said housing whereby the pressure caused by the expansion of said substance due to a rise in temperature of said substance is transmitted to the semiconductor body by said medium.

3. A transistor structure as defined in claim 2 wherein said housing consists of a material selected from the group consisting of ceramic, molybdenum and tungsten.

4. A transistor structure as defined in claim 2 wherein said semiconductor is selected from the group consisting of germanium and silicon.

5. A transistor structure as defined in claim 2 wherein said substance is selected from the group consisting of copper, aluminum, German silver, Phosphor bronze, zinc, brass, lead and mercury.

6. A transistor structure as defined in claim 2 wherein said transmitting medium is an oil.

7. A temperature stable junction solid state device comprising a rigid housing consisting of a material having a relatively low coefficient of expansion, a semiconductor body having a P–N junction therein within said housing, an electrically conductive material having a relatively high coefficient of expansion filling the rest of said housing, and electrodes in contact with said semiconductor body for connection in an external circuit.

8. A temperature stable junction solid state device comprising an outer container and an inner rigid housing snugly contained therein, said housing consisting of a material having a relatively low coefficient of expansion, a semiconductor body having a P–N junction therein within said housing, an expansion element comprising an electrically conductive material having a relatively high coefficient of expansion substantially filling the rest of said housing and electrodes in contact with said semiconductor body for connection in an external circuit.

9. A device as defined in claim 8 wherein said device is a junction diode.

10. A device as defined in claim 8 wherein said device is a junction transistor.

11. A device as defined in claim 8 wherein said expansion element is one of the electrodes of said device.

12. A device as defined in claim 8 wherein said expansion material is selected from the group consisting of copper, aluminum, German silver, Phosphor bronze, zinc, brass, lead, and mercury.

13. A device as defined in claim 8 wherein said outer container consists of a conductive metal.

14. A device as defined in claim 8 wherein said housing consists of ceramic.

References Cited in the file of this patent

UNITED STATES PATENTS

| | | |
|---|---|---|
| 1,905,703 | Harries | Apr. 25, 1933 |
| 2,328,488 | Peters | Aug. 31, 1943 |

FOREIGN PATENTS

| | | |
|---|---|---|
| 291,026 | Great Britain | June 13, 1929 |
| 590,284 | Germany | Dec. 28, 1933 |